(12) United States Patent
Patel et al.

(10) Patent No.: US 6,894,724 B2
(45) Date of Patent: May 17, 2005

(54) WATER RESISTANT SURVEILLANCE CAMERA HOUSING AND SCANNER WITH MAGNETIC POSITIONING STOPS

(75) Inventors: Yogesh R. Patel, Fresno, CA (US); Alexey Pokrovsky, Fresno, CA (US); Robert Thomas Herold, Clovis, CA (US)

(73) Assignee: Pelco, Clovis, CA (US)

( * ) Notice: Subject to any disclaimer, the term of this patent is extended or adjusted under 35 U.S.C. 154(b) by 760 days.

(21) Appl. No.: 10/032,634

(22) Filed: Oct. 26, 2001

(65) Prior Publication Data

US 2002/0054234 A1 May 9, 2002

Related U.S. Application Data

(60) Provisional application No. 60/308,552, filed on Jul. 27, 2001, and provisional application No. 60/245,463, filed on Nov. 3, 2000.

(51) Int. Cl.[7] ............................................... H04N 5/225
(52) U.S. Cl. ...................... 348/373; 396/427; 348/143
(58) Field of Search ................................. 348/375, 143, 348/130, 131; 369/427

(56) References Cited

U.S. PATENT DOCUMENTS

| | | | |
|---|---|---|---|
| 4,225,886 A | | 9/1980 | Smith |
| 4,543,609 A | * | 9/1985 | Smith .................... 348/207.99 |
| 4,736,218 A | * | 4/1988 | Kutman ...................... 396/427 |
| 4,928,174 A | | 5/1990 | Smith |
| 4,974,088 A | | 11/1990 | Sasaki |
| 5,159,368 A | | 10/1992 | Zemlin |
| 5,181,120 A | | 1/1993 | Hickey et al. |
| 5,224,675 A | * | 7/1993 | Ellenberger et al. ..... 248/183.4 |
| 5,418,567 A | | 5/1995 | Boers et al. |
| 5,850,579 A | | 12/1998 | Melby et al. |
| 5,905,923 A | | 5/1999 | Chitsaz et al. |
| 6,027,257 A | * | 2/2000 | Richards et al. ............ 396/428 |
| 6,735,382 B2 | * | 5/2004 | Schneider ..................... 396/26 |

* cited by examiner

*Primary Examiner*—Wendy R. Garber
*Assistant Examiner*—Gary C. Vieaux
(74) *Attorney, Agent, or Firm*—Gunster, Yoakley & Stewart, P.A.

(57) ABSTRACT

The present invention is a protective rotatable enclosure for the sensitive internal electrical and mechanical components of a surveillance camera scanner system that is particularly suited for deployment in an inverted position. The invention includes a sloped mounting base with an optional annular lip, a stepped relationship between the mounting base and the rotary spindle, and at least one O-ring seal. The invention also has the ability to set and adjust the limits of the scanning arc(s) of the scanner enclosure through the use of one or more fixed-position magnetically operable electronic sensors located inside the enclosure which are triggered by one or more external magnetic actuators adjustably deployed on the rotatable enclosure.

20 Claims, 13 Drawing Sheets

WATER RESISTANT SURVEILLANCE CAMERA HOUSING AND SCANNER WITH MAGNETIC POSITIONING STOPS

This application claims the benefit of provisional application Ser. No. 60/245,463 filed on Nov. 3, 2000, and provisional application Ser. No. 60/308,552 filed on Jul. 27, 2001.

BACKGROUND OF THE INVENTION

1. Field of the Invention

The present invention relates to surveillance camera systems, and more particularly to a rotary scanner for a surveillance camera for outdoor use that has water-resistant features to prevent rainwater and other moisture from entering the internal mechanics of the scanner, and which includes one or more magnetically operable positioning stops for setting the limits of the camera scan.

2. Description of the Prior Art

In the field of surveillance cameras, it is often desirable for the camera to be deployed with a housing that is mounted outdoors where it is exposed to changes in climate. It is also desirable for the camera housing to be mounted on a base that is part of an oscillating mechanical rotary unit that allows the camera to scan a particular area. Such rotary scanning units are typically mounted on top of a structure such as a protruding beam or a pole, but are also frequently mounted in an inverted position such as underneath a beam, as a dangling pendant, on a ceiling, and the like. When mounted on top of a structure, the camera housing tends to act as a shield, deflecting precipitation such as rain and snow away from the base. However, when mounted in an inverted position (such as underneath a ceiling or soffit), the underside of the housing and mounting base may be directly exposed to these elements. Over time, such exposure can result in rust and damage to mechanical parts, and, if the housing is penetrated, potential corrosion and damage to the camera and sensitive internal printed circuit boards.

It is therefore desirable to provide a housing and base assembly for a surveillance camera that is resistant to water and moisture penetration, especially when mounted in an inverted position, to provide protection for the internal electrical and mechanical components from exposure to precipitation, moisture and other external foreign contaminants.

Oscillating mechanical rotary bases are well known in the art, and have been used on surveillance cameras, household fans, and other devices for many years, allowing such devices to oscillate back and forth between defined limits. Such bases allow a surveillance camera to scan an area between the limits, instead of having a stationary view from being constantly pointed in the same direction. It is often desirable to be able to easily adjust the positions of the end limits or stops of the oscillation area in order to increase or decrease the size of the area to be scanned.

Existing scanning bases for surveillance cameras utilize one or physical switches inside the camera housing on the rotating part that are associated with adjustable mechanical stops on the stationary base which set the limits of the scan. The mechanical toggle lever of each switch extends out and away from the camera enclosure through a hole in the enclosure. When the rotating part approaches one of the stops, the toggle lever of the switch makes contact with the stop. As rotation continues, the lever is moved, toggling the switch. Circuitry inside the enclosure recognizes the toggle, and reverses the direction of the drive motor thereby reversing the direction of rotation. This rotation continues until the toggle lever encounters another stop, at which point the stop again physically moves the lever, toggling the switch and reversing the direction of rotation. This back and forth rotation continues between the stops. The positions of the stops establish the beginning and ending points of the scanning arc (i.e. the length of the arc of rotation).

Unfortunately, the opening(s) in the camera enclosure required by the mechanical toggle lever of the switch(es) expose the internal circuitry to the outside atmosphere, and particularly to foreign material such as moisture and dust. Over time, exposure to such foreign material can and often does result in corrosion of the sensitive printed circuit boards, as well as rust and damage to other internal electrical and/or mechanical parts. In addition, over time, the switch lever(s) and contacts tend to wear out as a result of the constant back and forth physical contact of the switch lever(s) and the stop(s). These kinds of continuing failures result in the need to regularly repair or replace significant parts of the rotatable base and/or camera electronics.

U.S. Pat. No. 4,543,609 discloses a television surveillance camera system that employs a magnet attached to the camera and a set of magnetically sensitive position sensors deployed in fixed positions below the rotational arc of the camera for monitoring and changing the direction of rotation of the camera. However, the position sensors of this invention are fixed, making it impossible to alter the length(s) of the arc(s) of rotation of the camera, or for the camera to rotate through a full 360° or more.

It is therefore desirable to provide a rotary base for a surveillance camera that provides a flexible and adjustable scanning range through a full 360° or more, while also providing protection for the internal electrical and mechanical components from exposure to outside foreign contaminants.

SUMMARY OF THE INVENTION

The present invention provides a protective rotatable enclosure for the sensitive internal electrical and mechanical components of a surveillance camera scanner system particularly when deployed in an inverted position together with the ability to set and adjust the limits of the scanning arc(s) of the enclosure (and hence, the surveillance camera mounted thereon) using a series of features including a sloped mounting base with an optional annular lip, a stepped relationship between the mounting base and the rotary spindle, at least one O-ring seal, and the use of one or more fixed-position magnetically responsive electronic sensors located inside the enclosure which are triggered by one or more external magnetic actuators adjustably deployed on the rotatable enclosure.

The present invention prevents foreign material from entering at the interface between the fixed spindle and the rotatable housing of the camera mounting assembly. The horizontal annular edge of the rotatable housing base of the present invention is sloped toward the outside in order that, when inverted, water, fluids, dust, debris and foreign matter will tend to roll off the housing base instead of seeping inside. An optional vertically oriented annular lip may be provided near the inside edge of the sloped region to further prevent such materials from reaching the inside. Additionally, at least one annular O-ring is provided between the fixed spindle and the rotatable housing base in order to seal the interface between these two parts, further preventing outside contaminants from entering the interior where they could cause premature wear and potential mechanical failures. The O-ring seal is oriented such that it is not in direct communication with the gap between the base and spindle such that it does not make direct contact with fluids from the outside, preventing the seal from being broken or dislodged. The combination of the slope, lip and seal of the present invention is capable of withstanding a sustained force of 65 gallons per minute without allowing penetration to the inside.

The present invention also allows considerable adjustability and flexibility with respect to establishing and changing the scanning arc(s) through which the enclosure rotates, while keeping the sensitive internal components shielded from outside contaminants. One or more magnetically sensitive contacts as well as other sensitive components are provided at fixed locations inside the enclosure that rotates around them. This provides the dual function of protecting these sensitive electronic components from the outside, while at the same time allowing the enclosure's arc(s) of rotation to be adjusted from the outside. Establishing and changing the limits of the arc(s) of rotation is accomplished using one or more durable magnetic actuators that are adjustably deployed on an external annular plate that is part of the base of the rotatable enclosure. These actuators may be moved to different locations on an annular track provided on the plate. As rotation occurs, each magnetic actuators is brought into conductive proximity of each magnetically responsive sensor inside the enclosure once per rotation. Each time this occurs, a signal is sent by the affected sensor to an internal microprocessor. The microprocessor can be programmed to selectively respond to the signals it receives from the sensors to change the direction of rotation, or to selectively ignore the signals to allow rotation to continue.

By programming different responses or patterns of responses to these signals, a wide range of rotational possibilities are available. Different modes of programming may also be implemented to change the pattern(s) of rotational arc(s). The rotational arc(s) may also be affected by changing the physical location of the actuators on the track. Thus, through a combination of physical and programming adjustments, virtually any desired rotational pattern may be established. Since magnetically responsive sensors are used, there is no physical contact between the actuators and the sensors, allowing the sensors to be physically separated from the actuators and enclosed inside the rotatable housing.

The speed of rotation may also be selected manually using a speed selection switch. Typical speeds for the stepper motors used in surveillance camera systems of this type range from 3 to 12 degrees of rotation per second. The present invention has a 3 position manual switch capable of selecting either 3°, 6° or 12°.

It is therefore a primary object of the present invention to prevent premature wear and potential mechanical failures by providing a rotatable protective surveillance camera support housing for covering sensitive electronic scanning equipment that is attached to a stationary base that prevents outside contaminants from reaching the inside, particularly when mounted in an inverted position.

It is also a primary object of the present invention to provide a method and apparatus for easily adjusting the rotational scanning arc(s) of a rotatable surveillance camera support housing while protecting the sensitive electronic scanning equipment inside the housing from outside contaminants.

It is also an important object of the present invention to provide a protective enclosure for holding sensitive electronic surveillance camera scanning equipment having an annular edge that is sloped toward the outside in order that, when inverted, water, fluids, dust, debris and other foreign matter will tend to roll off the enclosure instead of seeping inside.

It is also an important object of the present invention to provide a protective enclosure for holding sensitive electronic surveillance camera scanning equipment having a vertically oriented annular lip provided near the inside edge of the sloped region to further prevent outside contaminants from reaching the inside.

It is also an important object of the present invention to provide a protective enclosure for holding sensitive electronic surveillance camera scanning equipment having one or more annular O-rings provided between a fixed spindle and the rotatable enclosure in order to seal the interface between these two parts, further preventing outside contaminants from entering the interior where they could cause premature wear and potential mechanical failures.

It is also an important object of the present invention to provide a method and apparatus for easily adjusting the rotational scanning arc(s) of a rotatable surveillance camera support housing using one or more magnetically sensitive contacts deployed inside the housing instead of on the outside, serving the dual function of protecting sensitive interior electronic components from the outside, while at the same time allowing the housing's arc(s) of rotation to be adjusted from the outside.

It is also an important object of the present invention to provide a method and apparatus for easily adjusting the rotational scanning arc(s) and limits of a rotatable surveillance camera support housing by using one or more durable magnetic actuators that are adjustably deployed on an external annular plate that is part of the rotatable camera support housing base, such that the internal magnetically sensitive contacts are activated through the wall of the housing by the magnetic actuators as they rotate into the conductive proximity of the sensors.

It is also an important object of the present invention to provide a method and apparatus for easily adjusting the rotational scanning arc(s) of a rotatable surveillance camera support housing having one or more internal magnetically sensitive contacts and one or more adjustable external magnetic actuators and an internal microprocessor that may be programmed to selectively respond to the signals it receives from the contacts to either change the direction of rotation, or to selectively ignore the signals to allow rotation to continue.

It is also an important object of the present invention to provide a method and apparatus for easily adjusting the rotational scanning arc(s) of a rotatable surveillance camera support housing using a programmable microprocessor that selectively responds to signals from internal magnetically sensitive contacts as they are activated by external magnetic actuators in conjunction with physically adjusting the position(s) of the actuator(s) on an external track.

It is also an important object of the present invention to provide a method and apparatus for manually adjusting the speed of rotation of a rotatable surveillance camera support housing.

Additional objects of the invention will be apparent from the detailed descriptions and the claims herein.

DETAILED DESCRIPTION OF THE PREFERRED EMBODIMENTS

Figure 1:
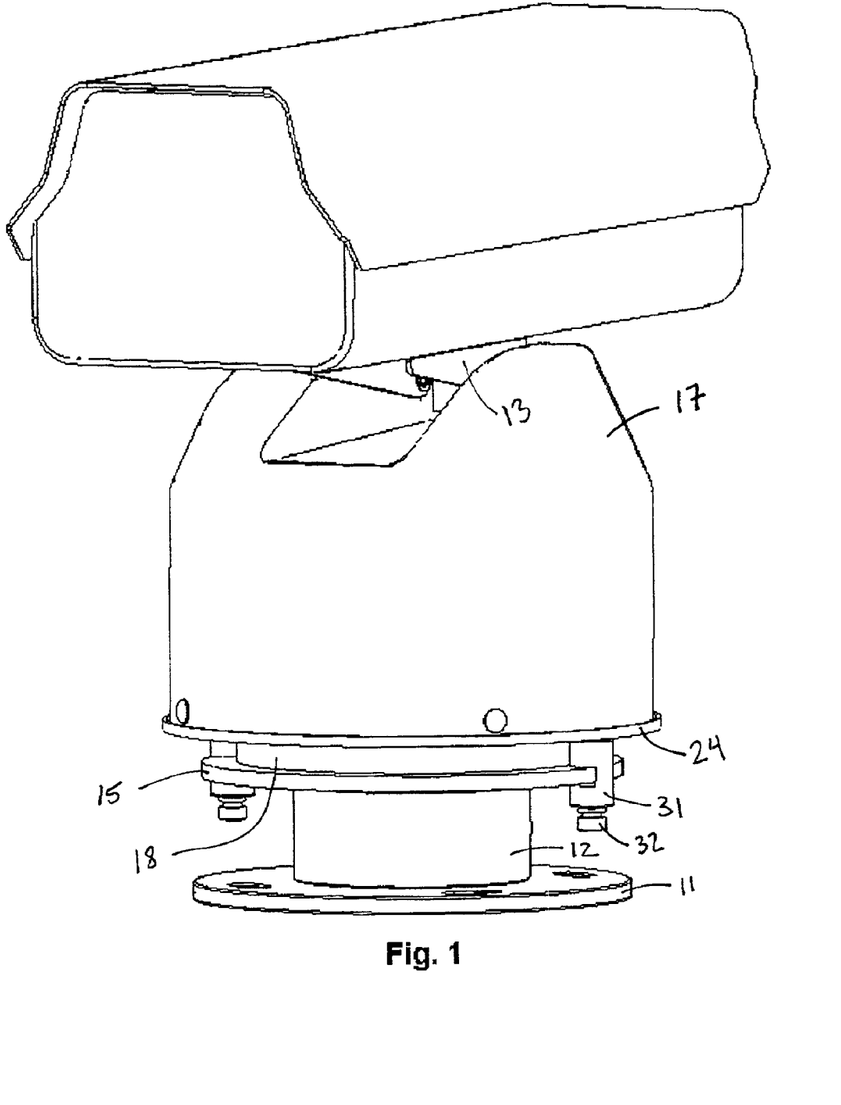
FIG. 1 is a perspective exterior view of one embodiment of the present invention.
Figure 2:
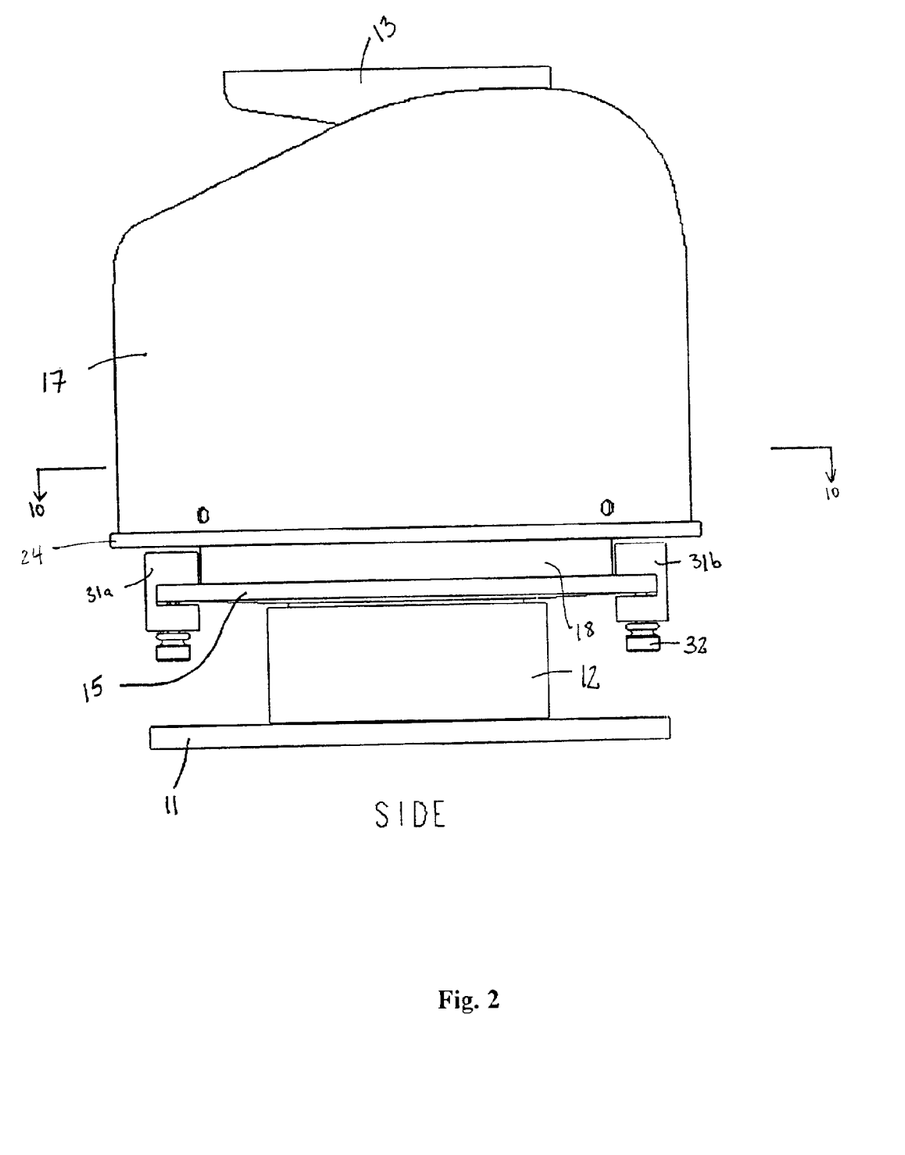
FIG. 2 is a side elevational view of the embodiment of FIG. 1
Figure 6:
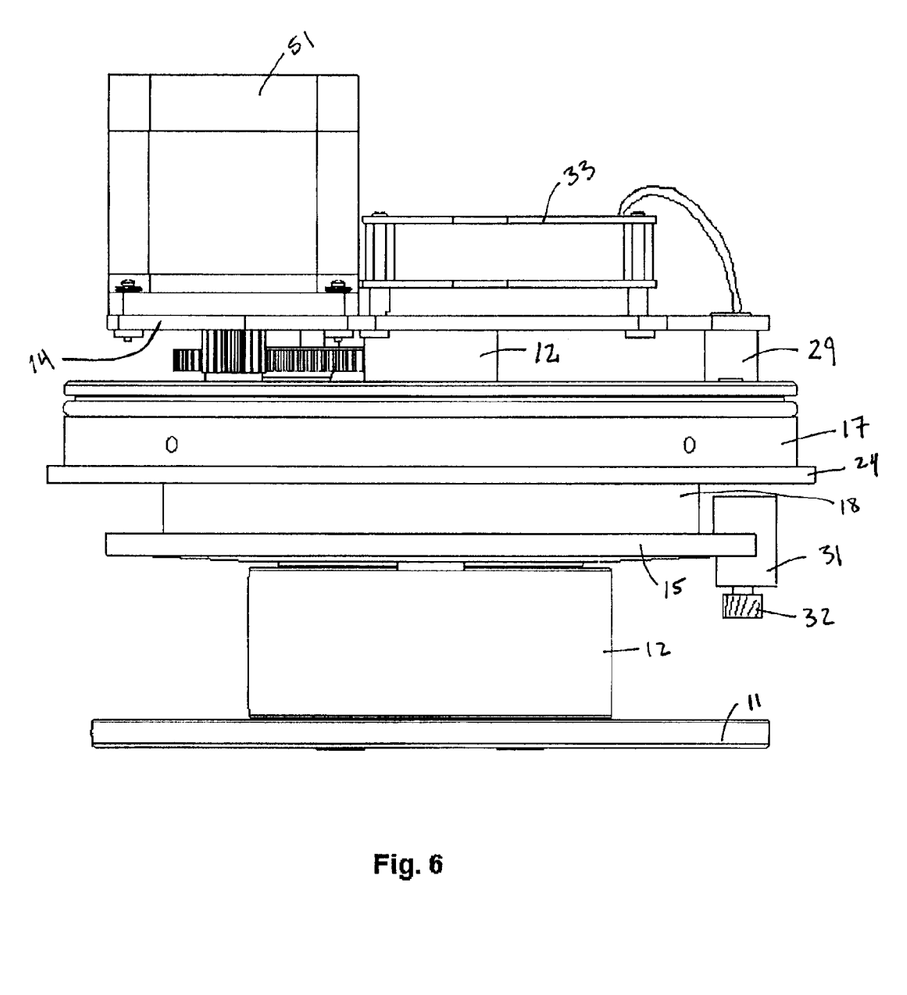
FIG. 6 is a partially cut-away side elevational view of the internal scanning mechanism of the present invention without the outer housing.

Referring to the drawings wherein like reference characters designate like or corresponding parts throughout the several views, and referring particularly to FIGS. 2 and 6, it is seen that the rotary scanner of the present invention includes a stationary section and a rotatable section. The stationary section includes a base 11 for attachment to a flat surface such as a wall, ceiling, soffit or shelf; a spindle 12 fixedly attached to mounting plate 11; and a set of electronic components fixedly attached to spindle 12. The proximal end of spindle 12 is attached to base 11 and the distal end supports the internal components. The rotatable section includes a support base 18 that fits over spindle 12, and a housing 17 that is fixedly attached to base 18. Rotatable housing 17 covers the motor, gears, microprocessor, magnetically responsive sensors, and other mechanical and electronic parts that allow the rotatable section to rotate relative to the stationary section. A camera is mounted on table 13 on the exterior of housing 17.

Figure 7:
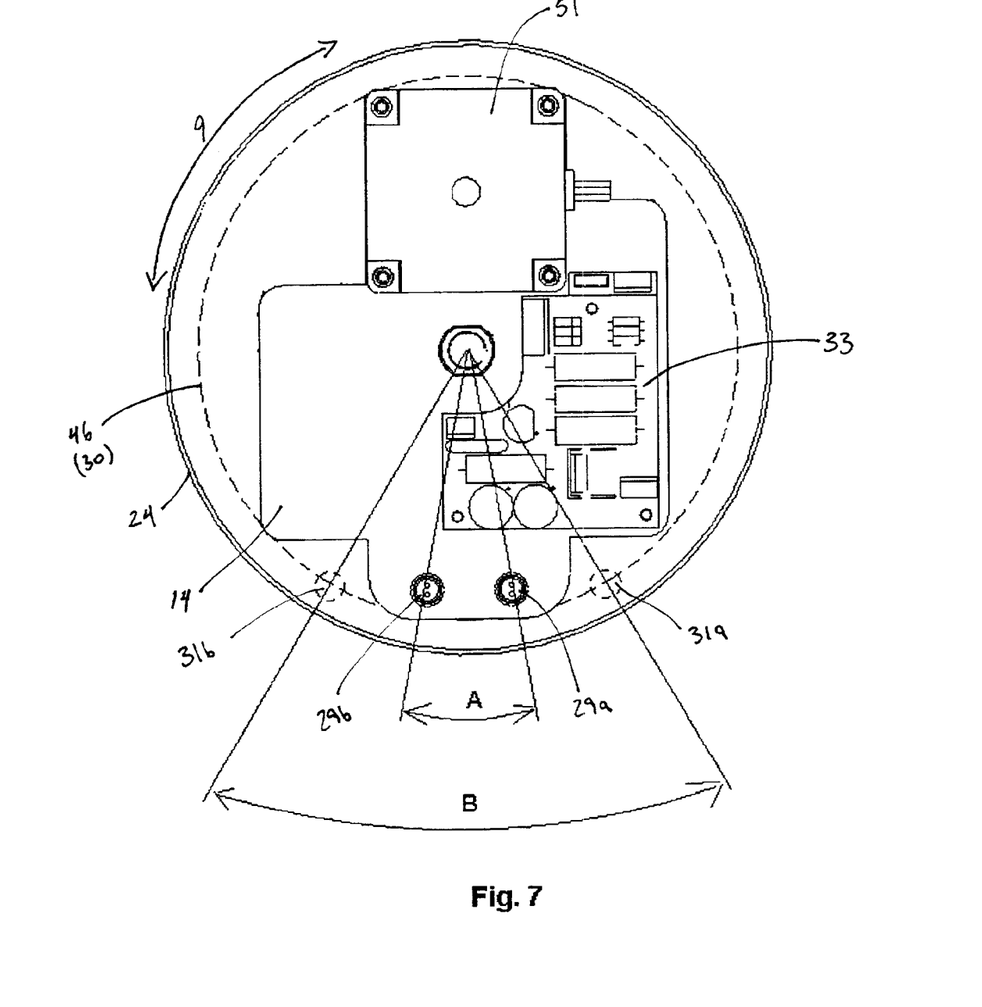
FIG. 7 is a top view of FIG. 6.
Figure 8:
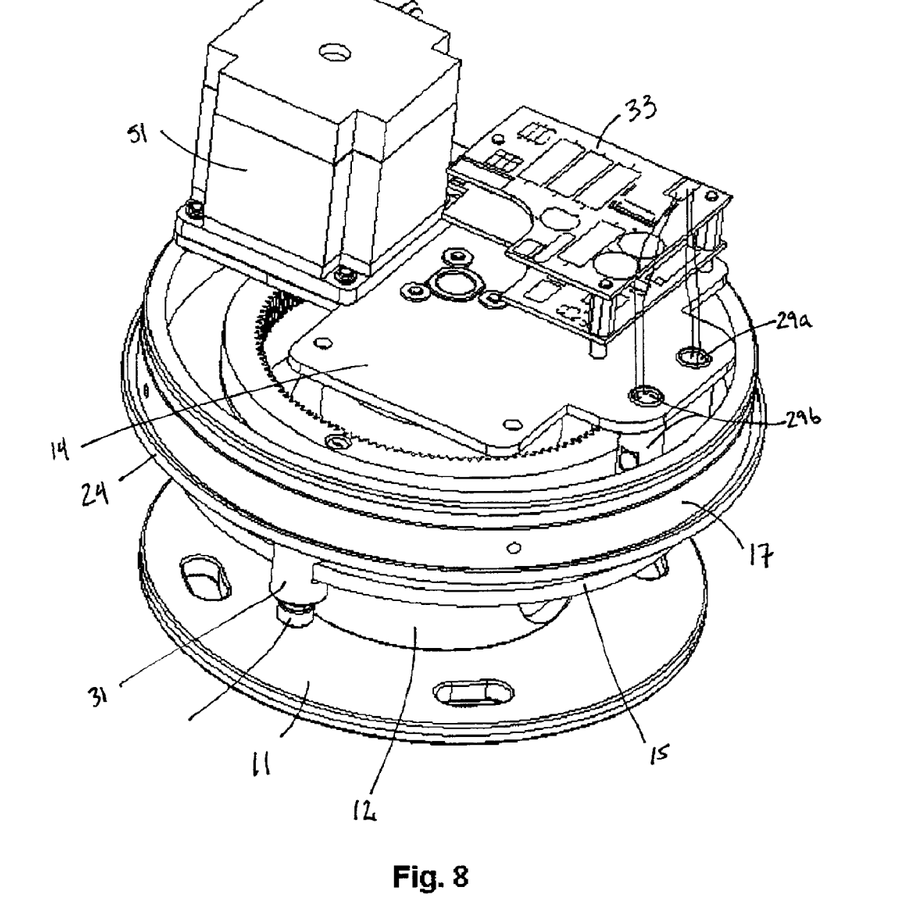
FIG. 8 is a perspective view of FIG. 6.
Figure 9:
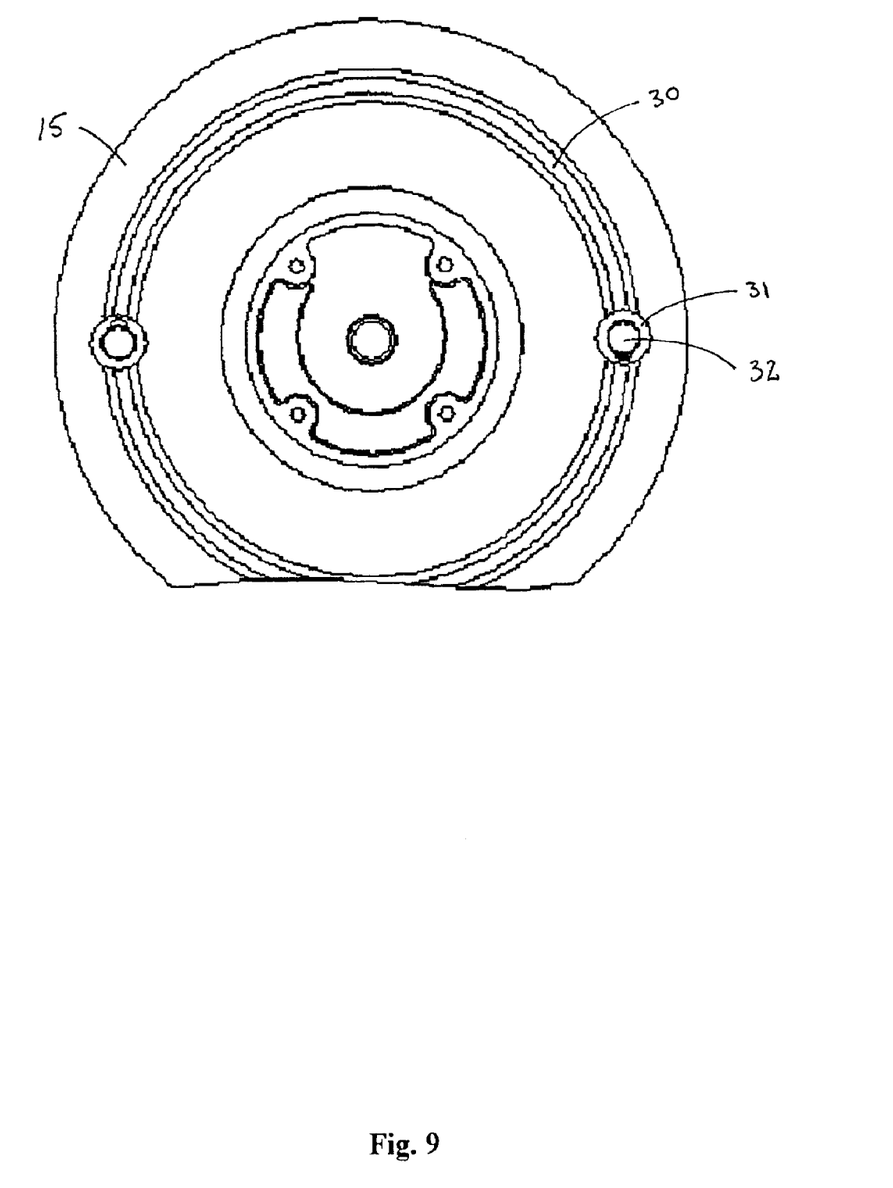
FIG. 9 is a bottom view of the support base showing magnetic positioning stops.
Figure 10:
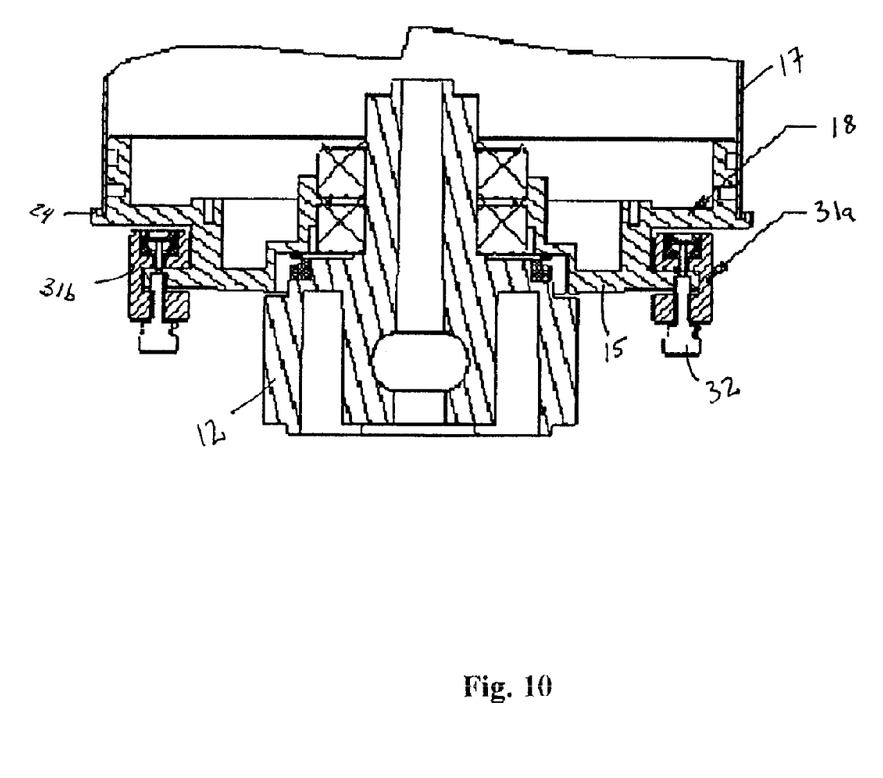
FIG. 10 is a sectional view along line 10—10 of FIG. 2.

The path of rotation is shown by arrows 9 in FIG. 7. The gears, mechanics, wiring and contacts between the stationary section and rotatable section allow the rotatable section to rotate continuously in either direction, clockwise or counterclockwise. Thus, if no stops are provided, it is capable of rotating around and around in either direction indefinitely.

Figure 3:
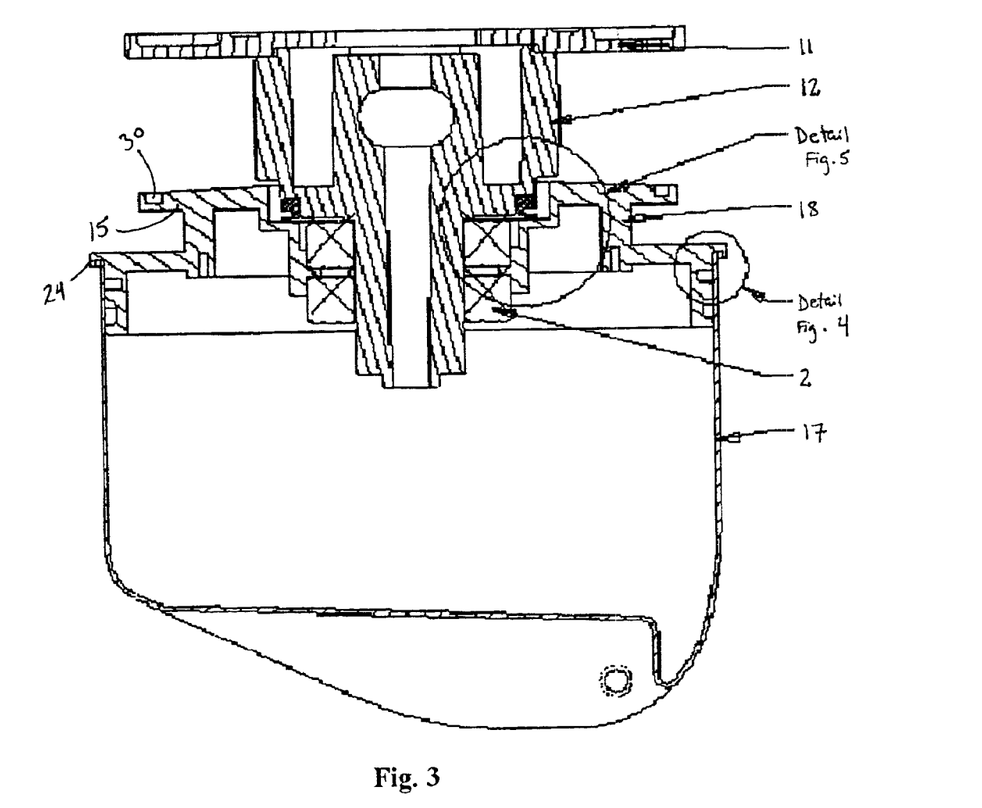
FIG. 3 is an inverted sectional side view of the embodiment of FIGS. 1 and 2.
Figure 5:
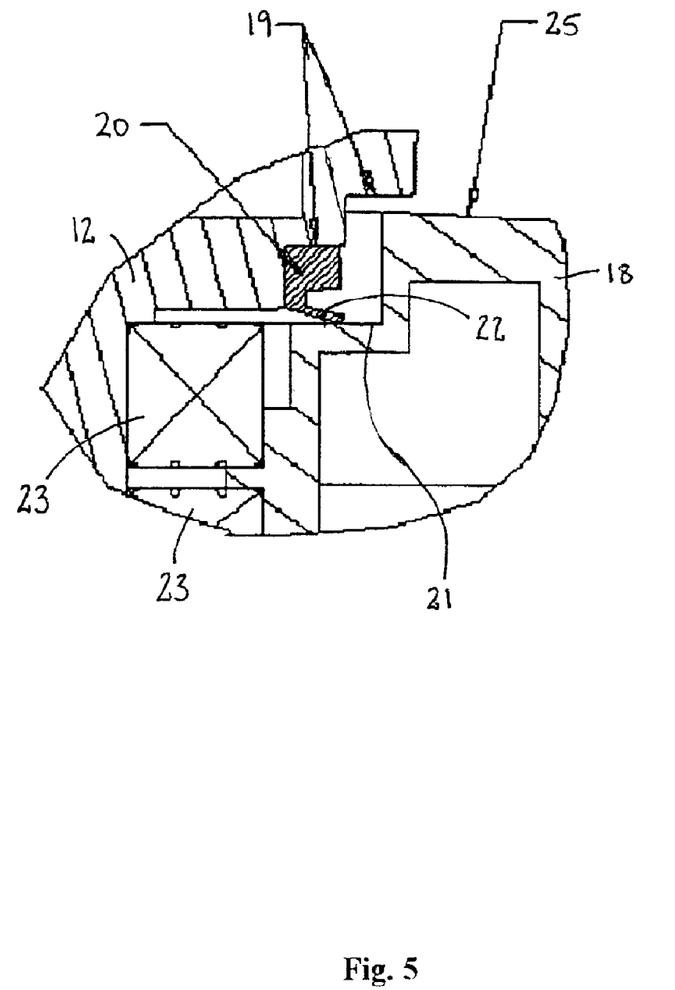
FIG. 5 is a detailed sectional side view of a different portion of FIG. 3.

Referring to FIGS. 3 and 5, a plurality of steps 19 are provided on spindle 12 which correspond to steps 21 on rotatable base 18 (see detail FIG. 5). At least one bearing 23 is provided between spindle 12 and base 18. At least one deformable annular seal 20 is provided in the gap between the steps 19 of spindle 12 and the corresponding steps 21 on base 18. The body of seal 20 fits into one of the steps 19 of spindle 12, and includes a deformable annular flange 22 which extends out to seal against a corresponding step 21 on base 18. The seal prevents water, moisture, dust and other contaminants from reaching bearings 23 or from penetrating further and potentially reaching the internal components inside housing 17, particularly when inverted as shown in FIG. 3.

Figure 4:
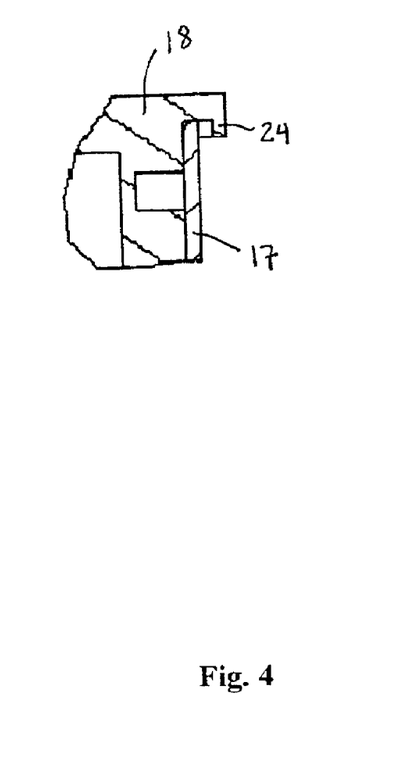
FIG. 4 is a detailed sectional side view of a portion of FIG. 3.

As an additional water-resisting feature, the outer bottom surface 25 of base 18 is radially sloped away from the center such that any precipitation that falls upon this surface is directed by gravity to the outside and away from the central workings of the scanner. As a further water-resisting feature, an overlapping annular flange 24 is provided at the intersection of base 18 and housing 17, as shown in FIGS. 3 and 4. The radial slope of annular surface 25 combined with the overlapping annular flange 24 help direct precipitation out and away from the center of the scanner.

Figure 5A:
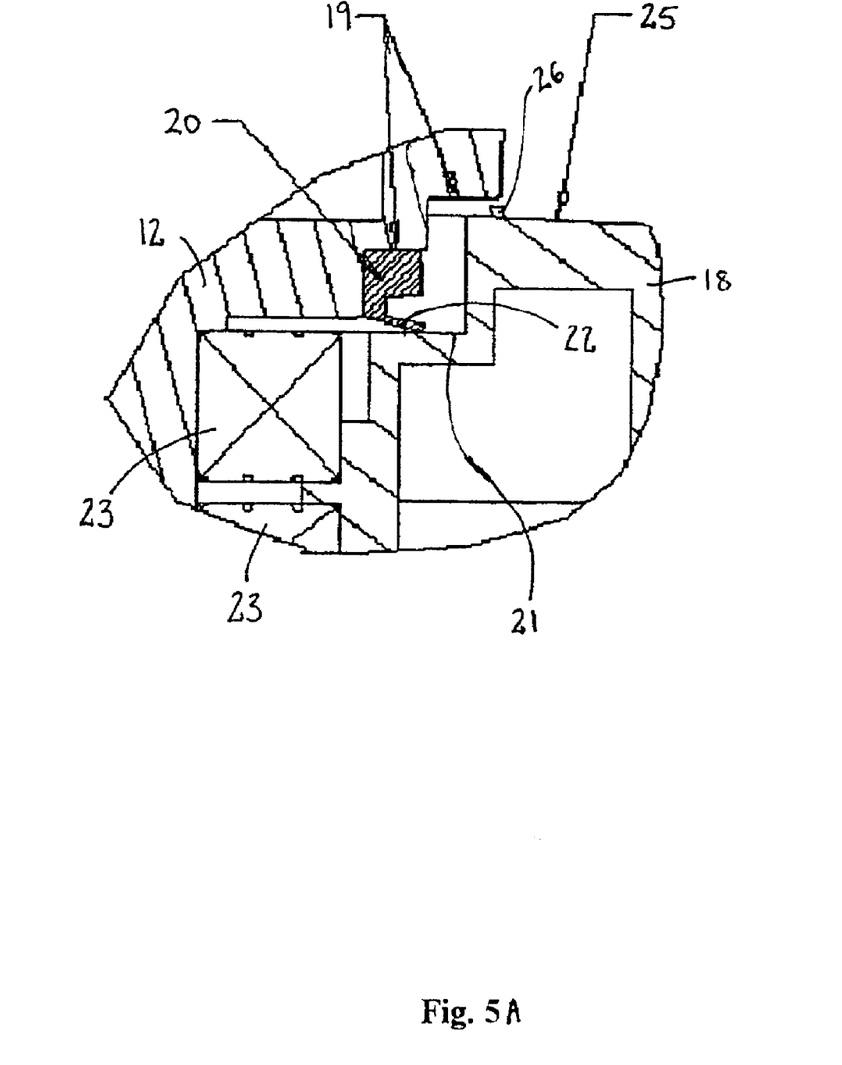
FIG. 5A is an alternative embodiment of the invention of FIG. 5.

In an alternative embodiment shown in FIG. 5A, an additional annular ridge or lip 26 is provided at the center of the radially sloping surface 25 of base 18 in the area immediately adjacent to spindle 12. Lip 26 acts as a barrier preventing precipitation falling onto surface 25 from entering the internal central area of the scanner. The lip 26 is useful in deployments where wind or other environmental conditions might overcome the gravitational slope of surface 25 and blow precipitation, dust and other contaminants into the central area of the scanner.

Figures 11, 12:
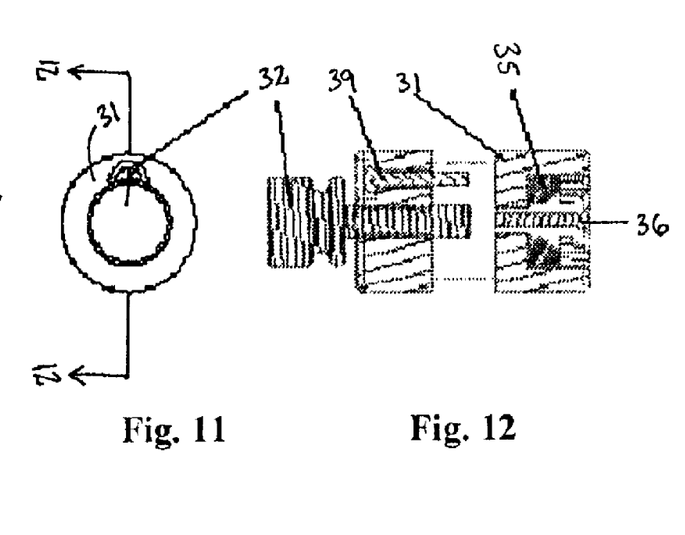
FIG. 11 is a bottom view of a magnetic positioning stop.
FIG. 12 is a sectional view along line (12—12) of FIG. 11.
Figure 13:
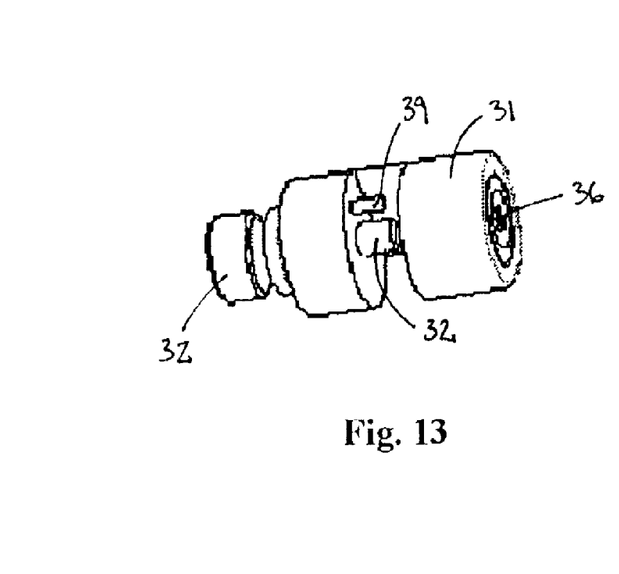
FIG. 13 is a perspective view of a magnetic positioning stop.
Figure 14:
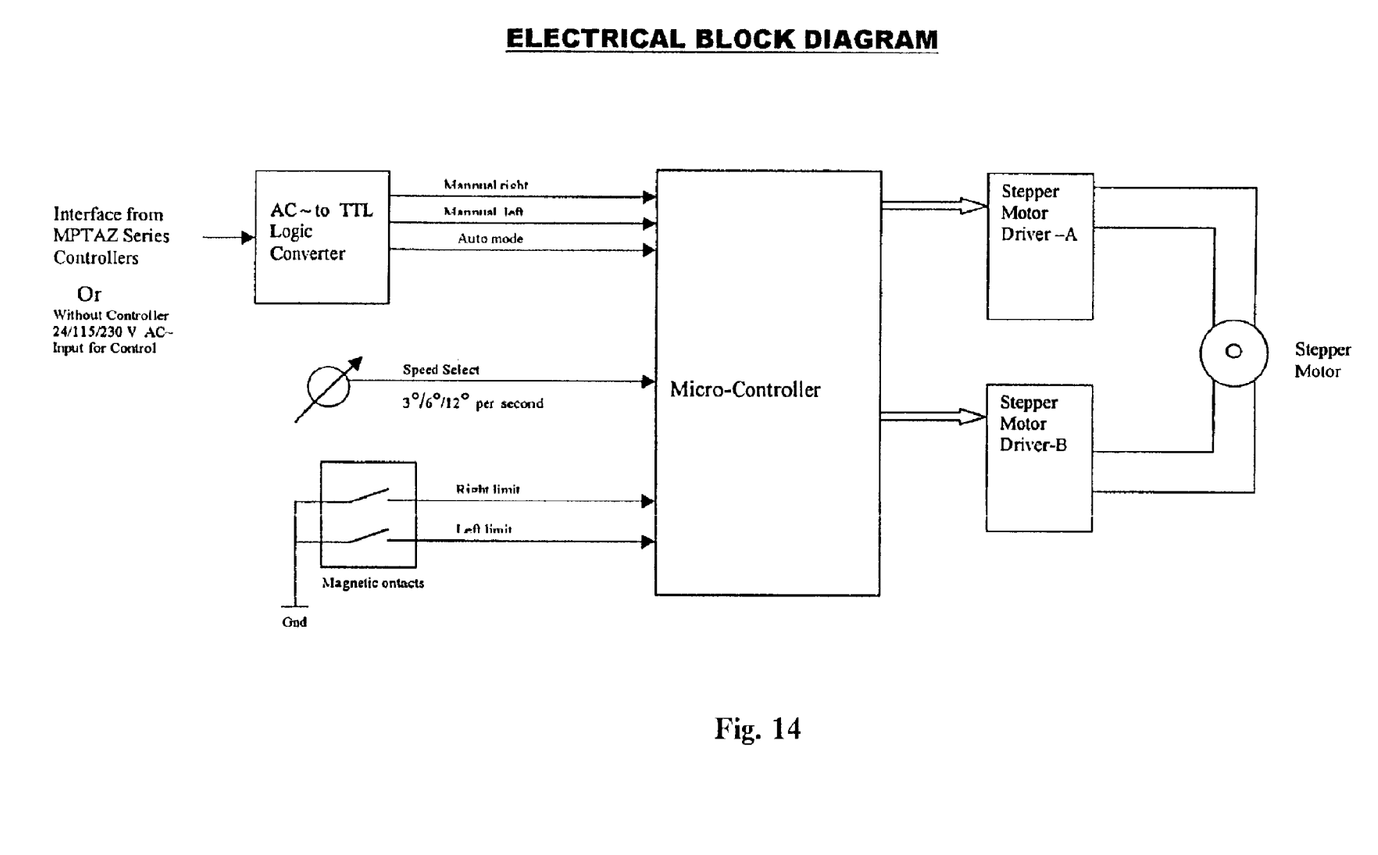
FIG. 14 is a schematic of the circuitry for the scanner of the present invention.

Referring to FIGS. 6–12, it is seen that one or more limit devices or stops 31 are provided for adjustable attachment to annular plate 15 of base 18. Each stop 31 includes a detachable attachment device, clamp or thumbscrew 32 for fixing the position of the stop 31 on an annular track on plate 15, preferably using an annular groove 30. Stop 31 is magnetized. Alternatively, at least the upper portion 25 of stop 31 is magnetized. This may be done, as illustrated in FIG. 12, using a magnet 35 that is held in place using a screw 36 or other attachment device. A captive screw 39 is also provided on stop 31 alongside thumbscrew 32 for engagement with groove 30 on plate 15. Captive screw 39 may be used in conjunction with or as an alternative to thumbscrew 32 for setting the position of stop 31. Captive screw 39 may be partially threaded into groove 30 allowing stop 31 to slide in the groove, but preventing stop 31 from falling off or being removed from groove 30. Thumbscrew 32 is then used to fix the position of stop 31. Alternatively, thumbscrew 32 may be eliminated and the position of stop 31 fixed by fully threading captive screw 39 into groove 30. This makes it more difficult to change the position of stop 31, discouraging unauthorized users from making such position changes.

The stationary mechanical and electronic components inside housing 17 include a reversible motor 51 (preferably a stepper motor) to impart rotational motion to base 18 relative to spindle 12. A micro-controller or processing unit 33 is also provided inside housing 17 for controlling such things as the speed and direction of motor 51, among other things. One or more magnetically responsive sensors 29 are also provided inside housing 17 in communication with microprocessor 33. The motor 51, microprocessor 33, and sensors 29 are all attached to spindle 12 such that their positions do not change as base 18 and housing 17 rotate around them.

The operation of motor 51 causes base 18 to rotate relative to stationary spindle 12. The magnetically sensitive contacts 29 are provided inside housing 17 near its perimeter. Each sensor or contact 29 is positioned such that as motor 51 rotates base 18, each actuator or stop 31 attached to plate 15 travels on a circular path or track that passes directly under each sensor 29. This path is shown by the circular phantom line 46 of FIG. 7. Each contact 29 is mounted such that its magnetically sensitive region comes into conductive relationship with the magnetic portion 35 of each stop 31 once along circular path 46. When such a conductive relationship is reached, sensor 29 sends a signal to the processing unit 33. Upon receipt of the signal, processing unit 33 may reverse the direction of rotation of motor 51, reversing the direction of movement of base 18. This reversal in direction will eventually bring contact 29 again into conductive relationship with stop 31 whereupon a signal is again sent to processing unit 33 which may again result in the reversal of direction of motor 51 and base 18.

The magnetically triggered limits of the present invention allow for complete encapsulation of the sensitive circuitry and mechanics of the rotatable mount, while maintaining all of the flexibility of adjustment of existing mounts. The encapsulation of the sensitive internal components of the mount protects them against failure from exposure to corrosive moisture and other external elements, prolonging the useful life of these components.

In a simple embodiment, a single contact 29 and a single stop 31 is provided, and the processor 33 is programmed to interpret every signal from contact 29 (each time it encounters stop 31) as "change direction." As a result, in this embodiment rotatable base 18 will travel back and forth through a full 360° circle, reversing direction each time. If a second stop 31 is provided in this embodiment, then base 18 will rotate back and forth on an arcuate path of less than 360° between the two stops 31. Thus, if the stops are 50° apart, base 18 will travel on an arc of either 50° or 310° between the two stops, depending upon where contact 29 was at the beginning of movement.

In another embodiment, two contacts 29*a* and 29*b* may be provided with a single stop or actuator 31. Depending upon the programming of the processing unit 33, the signal from each of such contacts 29*a* or 29*b* may result in a reversal of direction of motor 51 and base 18. In this embodiment, if every signal from contact 29*a* or 29*b* is interpreted to mean "change direction," and the contacts are 20° apart, and then base 18 will rotate back and forth through a 340° arc. Alternatively, if the first signal from either contact 29*a* or 29*b* is interpreted as "get ready" and the second signal is interpreted as "change direction," and the contacts are 20° apart, then base 18 will rotate back and forth through a 380° arc. However, the positions of the contacts 29*a* and 29*b* inside housing 17 are generally fixed. Thus, in order to adjust the arc of rotation, at least one additional stop or actuator 31 is required.

In the preferred embodiment, two magnetically sensitive contacts 29*a* and 29*b* are provided with at least two actuators or stops 31*a* and 31*b* as illustrated in FIG. 7. The presence of two contacts 29*a* and 29*b* makes it possible to rotate base 18 through an arc of more or less than 360° depending upon the programming of unit 33 as described in the previous embodiment. The presence of an additional stop 31*b* provides additional flexibility with respect to the size of the arc(s) of rotation through which base 18 travels. Depending upon the programming, and the variable positioning of stops 31*a* and 31*b* with respect to each other, this may be any of several different arcs of more or less than 360°. In particular, the processor may be programmed to ignore certain signals (every other signal, two out of every three signals, etc.) and change direction on other signals. Different processor modes may also be provided, thereby changing the processor's response to signals after a given period of time or a given number of signals/rotations (e.g. once every hour, ignore all signals and rotate through a full 360°; or, continuously changing the pattern of responses to signals (thereby changing the arcs of rotation) at given time intervals (or after a certain number of signals) to change the scope of the scan).

For example, in the preferred embodiment having two contacts 29*a* and 29*b* and two actuators or stops 31*a* and 31*b*, the processor 33 may be programmed to interpret the first signal from contact 29*a* as "get ready" and the second signal form contact 29*a* as "change direction." Similarly, when traveling in the opposite direction, the processor 33 may interpret the first signal from contact 29*b* as "get ready" and the second signal as "change direction." Using FIG. 7, if angle A between contacts 29*a* and 29*b* is 20°, and angle B between stops 31*a* and 31*b* is 60°, when traveling clockwise stop 31*b* will first encounter contact 29*a* resulting in a "get ready" signal. When stop 31*a* encounters contact 29*a* (assuming contact 29*b* ignores stop 31*b* as it passes by), the above programming will result in a reversal of direction to counterclockwise. After 340° (assuming stop 31*b* is again ignored as it passes by contacts 29*b* and 29*a*), stop 31*a* will be encountered by contact 29*b* which is the "get ready" signal. Then, after another 60° (assuming contact 29*a* ignores stop 31*a* as it passes by), stop 31*b* will be encountered by contact 29*b* resulting in a reversal of direction. Thus, an overlapping 400° of rotation will occur.

It will be appreciated from the above example that the microprocessor 33 may be selectively programmed to ignore or not to ignore signals from contacts 29*a* and 29*b* as stops 31*a* and 31*b* are encountered (e.g. respond differently to signals or patterns of signals from contacts 29*a* and 29*b*), such that different arcs or patterns of arcs may be established for scanning. It will also be appreciated that the lengths of these arcs may be changed by physically changing the position of stops 31*a* and 31*b* on the track of plate 15 in conjunction with or separate from any change in programming. Employment of additional stops (31*c*, 31*d*, etc.) will allow additional flexibility of programming, arc patterns and arc lengths. The programming mode may also be automatically changed on a periodic or random basis to respond differently to the signals, thereby defining different arcs or patterns of arcs at different times. By using techniques such as these, any desired limit of more or less than 360°, can be achieved at any desired time.

It is to be appreciated that a plurality of additional stops 31 and/or additional contacts 29 may be provided to allow for any desired combination of arcs of rotation and direction.

By properly positioning, programming and combining the stops 31 and contacts 29 of the present invention, a wide range of scanning options are available.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A rotatable scanner for supporting a surveillance camera comprising:
   a. a stationary section including a base and a spindle, one end of said spindle being attached to said base, and the other end of said spindle having a plurality of annular steps;
   b. a rotatable section for rotatable engagement with said stationary section, said rotatable section including an annular support base having a central opening for receiving said spindle, said opening having annular steps that correspond to the steps of said spindle, and a cover attached to said annular support base, said cover including an exterior support for holding said camera;
   c. a motor with gear mounted on said stationary spindle inside said cover;
   d. a gear on said rotatable annular support base for engagement with said motor gear to allow said motor to cause the rotatable section to rotate relative to the stationary section; and
   e. at least one O-ring seal on one of said annular steps between said spindle and said opening.

2. The scanner of claim 1 wherein an annular lip is provided on said annular support base where said cover is attached to said base to prevent outside contaminants from reaching the inside of said cover.

3. The scanner of claim 2 wherein said annular support base has an inner surface inside said cover and an outer surface facing said spindle base, and said outside surface is radially sloped away from said central opening toward said lip in order to deflect fluids and contaminants away from the spindle.

4. The scanner of claim 3 wherein an annular ridge is provided on said sloped surface near the central opening in order to deflect fluids and contaminants away from the spindle.

5. The scanner of claim 1 wherein:
   f. at least one magnetically responsive sensor is provided on said stationary section in communication with said motor, said at least one sensor being under said cover and located near the corner between said annular support base and said cover;
   g. an annular plate is provided on said annular support base adjacent to and outside of said cover, said plate defining an annular track; and
   h. at least one magnetic actuator is movably deployed on said track such that said at least one actuator is capable of coming into magnetically conductive proximity with said at least one sensor once per rotation of said rotatable section which generates a signal to said motor.

6. The scanner of claim 5 wherein a microprocessor is provided on said stationary section in communication with said at least one sensor and said motor, said microprocessor being programmed to receive and selectively respond to signals from said at least one sensor.

7. The scanner of claim 6 wherein the response of said microprocessor to a signal from said at least one sensor is selected from the group of: ignoring the signal, and changing the direction of rotation of the motor in response to the signal.

8. The scanner of claim 7 wherein a plurality of magnetically responsive sensors are provided on said stationary section under said cover and located near the corner between said annular support base and said cover.

9. The scanner of claim 7 wherein a plurality of magnetic actuators are movably deployed on said track such that each such actuator is capable of coming into magnetically conductive proximity with said at least one sensor once per rotation of said rotatable section.

10. The scanner of claim 8 wherein a plurality of magnetic actuators are movably deployed on said track such that each such actuator is capable of coming into magnetically conductive proximity with each of said plurality of sensors once per rotation of said rotatable section.

11. An adjustably rotatable scanner for supporting a surveillance camera comprising:
   a. a stationary section including a surface mount;
   b. a rotatable section including an annular support base and a cover that is rotatably engaged with said stationary section, the cover including an exterior support for holding the camera;
   c. a motor with gear mounted on said stationary section;
   d. a corresponding gear on said rotatable section allowing said motor to cause said rotatable section to rotate relative to said stationary section;
   e. at least one magnetically responsive sensor provided on said stationary section in communication with said motor, said at least one sensor being under said cover and located near the corner between said annular support base and said cover;
   f. an annular plate provided on said annular support base adjacent to and outside of said cover, said plate defining an annular track; and
   g. at least one magnetic actuator movably deployed on said track such that said at least one actuator is capable of coming into magnetically conductive proximity with said at least one sensor once per rotation of said rotatable section generating a signal to said motor.

12. The scanner of claim 11 wherein a microprocessor is provided on said stationary section in communication with said at least one sensor and said motor, said microprocessor being programmed to receive and selectively respond to signals from said at least one sensor.

13. The scanner of claim 12 wherein the response of said microprocessor to a signal from said at least one sensor is selected from the group of: ignoring the signal, and changing the direction of rotation of the motor in response to the signal.

14. The scanner of claim 13 wherein an annular lip is provided on said annular support base where said cover is attached to said base to prevent outside contaminants from reaching the inside of said cover.

15. The scanner of claim 14 wherein said annular support base has an inner surface inside said cover and an outer surface facing said surface mount, and said outside surface is radially sloped away from center toward said lip in order to deflect fluids and contaminants away from the center.

16. The scanner of claim 15 wherein an annular ridge is provided on said sloped surface near the center in order to deflect fluids and contaminants away from the center.

17. The scanner of claim 16 wherein said stationary section includes a base and a spindle, one end of said spindle being attached to said base, and the other end of said spindle having a plurality of annular steps; said annular support base has a central opening for receiving said spindle, said opening having annular steps that correspond to the steps of said spindle; and at least one O-ring seal is provided on one of said annular steps between said spindle and said opening.

18. The scanner of claim 17 wherein a plurality of magnetically responsive sensors are provided on said stationary section under said cover and located near the corner between said annular support base and said cover.

19. The scanner of claim 17 wherein a plurality of magnetic actuators are movably deployed on said track such that each such actuator is capable of coming into magnetically conductive proximity with said at least one sensor once per rotation of said rotatable section.

20. A method for adjusting the arc of rotation of a scanner for a surveillance camera comprising the steps of:
   a. attaching a rotatable scanner section to stationary scanner section, the rotatable section having an annular opening for receiving the stationary section, a cover for protecting the stationary section, and an exterior annular track;
   b. deploying at least one magnetically responsive sensor inside the stationary section under the cover and adjacent to the track;
   c. adjustably deploying at least one magnetic actuator on the track of the rotatable section such that said at least one actuator is capable of coming into magnetically conductive proximity with said at least one sensor once per rotation triggering a signal;
   d. programming a microprocessor mounted on said stationary section to selectively respond to each such signal with a response selected from the group of: ignoring the signal, and changing the direction of rotation in response to the signal;
   e. rotating said rotatable section relative to said stationary section; and
   f. selectively changing the direction of rotation of said rotatable section according to the responses to the signals generated by said sensors.

* * * * *